(12) United States Patent
Rankin et al.

(10) Patent No.: US 7,618,081 B2
(45) Date of Patent: Nov. 17, 2009

(54) QUICK RELEASE CARGO NET FOR CONVERTIBLE VEHICLE

(76) Inventors: Jesse Roy Rankin, 4606 Chaha Rd. #103, Garland, TX (US) 75043; Scott Tucker Ervin, 2020 Tisinger Ave., Dallas, TX (US) 75228

(*) Notice: Subject to any disclaimer, the term of this patent is extended or adjusted under 35 U.S.C. 154(b) by 71 days.

(21) Appl. No.: 11/677,558

(22) Filed: Feb. 21, 2007

(65) Prior Publication Data
US 2008/0211263 A1    Sep. 4, 2008

Related U.S. Application Data

(60) Provisional application No. 60/778,046, filed on Mar. 2, 2006.

(51) Int. Cl.
*B60J 1/20* (2006.01)

(52) U.S. Cl. .................. 296/138; 135/913; 160/370.21; 296/186.2

(58) Field of Classification Search .............. 296/24.33, 296/107.09, 107.12, 136.1, 138, 181.4, 186.1, 296/186.2, 191, 97.2, 97.3, 102, 145; 24/265 R, 24/265 C, 265 BC; 135/88.09, 117, 119, 135/913; 160/327, 328, 354, 368.1, 370.21
See application file for complete search history.

(56) References Cited

U.S. PATENT DOCUMENTS

| | | | | | |
|---|---|---|---|---|---|
| 1,203,706 | A | * | 11/1916 | Cone | 296/102 |
| 1,509,450 | A | * | 9/1924 | Sweeney | 160/273.1 |
| 1,614,010 | A | * | 1/1927 | Martinov | 296/145 |
| 2,256,890 | A | * | 9/1941 | Brown et al. | 296/111 |
| 2,423,748 | A | * | 7/1947 | Acheson | 296/107.09 |
| 2,430,442 | A | * | 11/1947 | Acheson | 296/102 |
| 2,463,646 | A | * | 3/1949 | Schassberger | 296/104 |
| 3,552,613 | A | * | 1/1971 | Nye | 224/406 |
| 3,709,553 | A | * | 1/1973 | Churchill et al. | 296/145 |
| 3,882,575 | A | * | 5/1975 | Jolly | 24/661 |
| 5,121,958 | A | * | 6/1992 | Goeden et al. | 296/37.1 |
| 5,290,086 | A | * | 3/1994 | Tucker | 296/152 |
| 5,327,989 | A | * | 7/1994 | Furuhashi et al. | 180/248 |
| 5,443,110 | A | * | 8/1995 | Plott, Sr. | 160/368.1 |
| 5,669,655 | A | * | 9/1997 | Hammond | 296/26.01 |
| 5,758,679 | A | * | 6/1998 | Tamburelli | 135/88.09 |
| 6,003,936 | A | * | 12/1999 | Gordon | 296/218 |
| 6,286,888 | B1 | * | 9/2001 | Essig | 296/102 |
| 6,439,637 | B1 | * | 8/2002 | Tyrer | 296/79 |
| 6,505,880 | B1 | * | 1/2003 | Castro | 296/102 |

(Continued)

*Primary Examiner*—Glenn Dayoan
*Assistant Examiner*—Paul A Chenevert
(74) *Attorney, Agent, or Firm*—David W. Carstens; Carstens & Cahoon LLP

(57) ABSTRACT

An device for attaching a cargo restraint system to the incorporated roll bar of a motor vehicle with convertible or removable top. By utilizing this existing portion of the vehicle, added cargo retention can be provided for, by attaching an device around said roll bar extending around the rear perimeter of the passenger area. In order to retain maximum driver visibility, the device will consist of netting material similar to that used in fishing, bordered by a heavier material to enable attachment to the vehicle. By utilizing an existing feature of the vehicle, the user is not required to modify any portion of the vehicle in order to attach the invention. Additionally, by not sharing any points of attachment with the existing top, the user is able to utilize the invention with or without the existing convertible top.

6 Claims, 4 Drawing Sheets

U.S. PATENT DOCUMENTS

| | | | |
|---|---|---|---|
| 6,779,537 B1 * | 8/2004 | Miller | 135/117 |
| 6,817,647 B1 * | 11/2004 | Green | 296/77.1 |
| 7,025,404 B1 * | 4/2006 | Gilbert | 296/102 |
| 7,213,866 B2 * | 5/2007 | Metts et al. | 296/102 |
| 2002/0056980 A1 * | 5/2002 | Saczalski et al. | 280/748 |
| 2003/0085586 A1 * | 5/2003 | Kiousis et al. | 296/102 |
| 2004/0100124 A1 * | 5/2004 | Bush, Sr. | 296/186.2 |
| 2005/0001446 A1 * | 1/2005 | Morley | 296/102 |
| 2005/0172989 A1 * | 8/2005 | Choi | 135/119 |

* cited by examiner

QUICK RELEASE CARGO NET FOR CONVERTIBLE VEHICLE

CROSS-REFERENCE TO RELATED APPLICATIONS

This application claims the benefit of provisional Application No. 60/778,046, filed Mar. 2, 2006.

BACKGROUND OF THE INVENTION

1. Field of the Invention

The present invention relates to a vehicular-mounted cargo restraint device.

2. Description of Related Art Including Information Disclosed Under 37 CFR 1.97 and 1.98

Convertible vehicles, such as those manufactured under the Jeep® trademark, are immensely popular because removal of the top provides a degree of freedom to the occupants unmatched by other vehicles. Such convertible vehicles often incorporate a roll bar to protect the occupants of the vehicle from harm due to a rollover when the top is removed. However, while the roll bar protects the occupants in this fashion, it does very little to restrain items that may be laying about the cargo area of the vehicle. While driving, these objects often fall or are blown out of the rear of the vehicle due to the effects of the passing wind. Further, external debris such as rocks or trash on a roadway can enter the vehicle and strike the vehicle occupants through the open areas of the roll bar. What is needed is a device that allows for removal of the convertible top while simultaneously providing retention of the loose contents of the vehicle interior and protection of the occupants from flying external debris.

BRIEF SUMMARY OF THE INVENTION

In general, the invention relates to retaining cargo and personal possessions in any make or model vehicle with a removable top and roll bar. It is designed for use when the roof and sides are removed, but may be used in conjunction with any form of canopy or top. Additionally the attachment system allows for access to rear cargo from either side or the rear of the vehicle through quick release attachments at locations on each roll bar attachment.

The invention provides cargo security while driving, by placing a restrictive net around the rear perimeter of the vehicle. By utilizing the existing roll bar as a frame, the net keeps wind from blowing lighter objects out of the vehicle when driving with the top down or off. In the preferred embodiment, the invention is also capable of restraining heavier cargo from falling out of the vehicle, creating a larger cargo containment area. Quick release attachments allow easy access to cargo without the necessity of complete removal. Additionally, the system is designed so that vision and convertible top operation are not hindered.

Any convertible owner can attest to the loss of non-secured items due to wind while driving with the top down. Most consider this as a justifiable expense for the experience of open air driving. While the aforementioned system does not promise the prevention of loss, it is designed to greatly reduce the chance of items blowing out of a vehicle without interfering with the convertible experience.

These and other improvements will become apparent when the following detailed disclosure is read in light of the supplied drawings. This summary is not intended to limit the scope of the invention to any particular described embodiment or feature. It is merely intended to briefly describe some of the key features to allow a reader to quickly ascertain the subject matter of this disclosure. The scope of the invention is defined solely by the claims when read in light of the detailed disclosure.

BRIEF DESCRIPTION OF THE SEVERAL VIEWS OF THE DRAWING(S)

Figure 1:
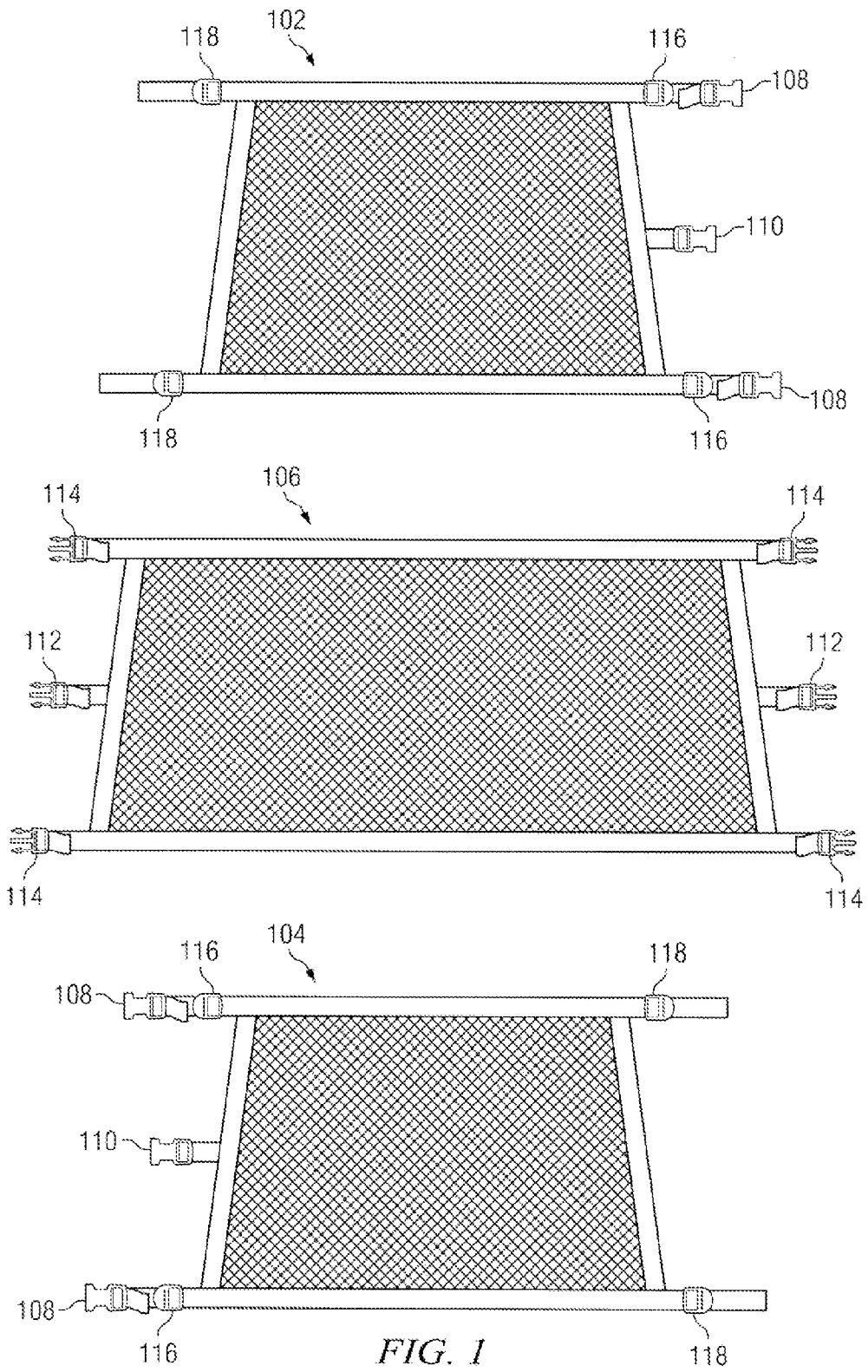
FIG. 1 illustrates the invention in its entirety, comprising three separate netting units.

The above figures are provided for the purpose of illustration and description only, and are not intended to define the limits of the disclosed invention. Use of the same reference number in multiple figures is intended to designate the same or similar parts. Furthermore, when the terms "top," "bottom," "first," "second," "upper," "lower," "height," "width," "length," "end," "side," "horizontal," "vertical," and similar terms are used herein, it should be understood that these terms have reference only to the structure shown in the drawing and are utilized only to facilitate describing the particular embodiment. The extension of the figures with respect to number, position, relationship, and dimensions of the parts to form the preferred embodiment will be explained or will be within the skill of the art after the following teachings of the present invention have been read and understood.

DETAILED DESCRIPTION OF THE INVENTION

The present invention will now be fully described and illustrated for further clarification of the detailed embodiments. Although alternate methods and similar or equivalent materials to those described herein may be used in the construction and mounting of said invention, suitable methods and materials are described below. Accordingly, this invention may, however, be embodied in many different forms and should not be construed as limited to the described and illustrated embodiments set forth herein. Rather these embodiments as provided solely for the purpose of clarification and thorough understanding as to the nature and scope of the invention.

FIG. 1 illustrates the invention in its entirety, comprising of three separate netting units. Each unit is a trapezoidal shaped net bordered on all sides with heavy duty material which has interconnecting and mounting devices attached. The left (driver's) side netting unit (102) and right (passenger's) side netting unit (104) are substantially equal in dimension but assembled so as to be mirror images of each other. The rear (center) netting unit (106) is constructed in the same manner as the driver's and passenger's side netting units, but to different dimensions as required of the spacing between the rearward uprights of the vehicle roll bar. Each netting unit consists of a single piece of netting material bordered on the front and back of its respective perimeter with flexible webbing material. The side of each netting unit in this embodiment is constructed with the upper and lower border webbing material cut longer than the horizontal dimensions of the netting, creating a strap to which one or more attachment devices are affixed. The left and right netting units (102 and 104) incorporate a quick-release attachment device (108) while the center netting unit (106) incorporates a suitable mating attachment device (114). These attachment devices are utilized to attach the netting units to the vehicle and to each other. An additional webbing strap and attachment device (110) is attached to the rear vertical section of each side netting unit (102 and 104). Accordingly, the rear netting unit (106) incorporates the suitable mating attachment devices (112) corresponding to each rear attachment device (110) on the side units. Webbing strap tensioning devices (116 and 118) are also incorporated to allow adjustment of the respective webbing strap when attached to the vehicle roll bar uprights. The rearward tensioning devices (116) serve to adjust strap tension where the respective side netting unit joins with the center webbing unit (106). The forward tensioning devices (118) serve to adjust strap tension where the respective side netting unit merely wraps around the forward most roll bar upright.

Figure 2:
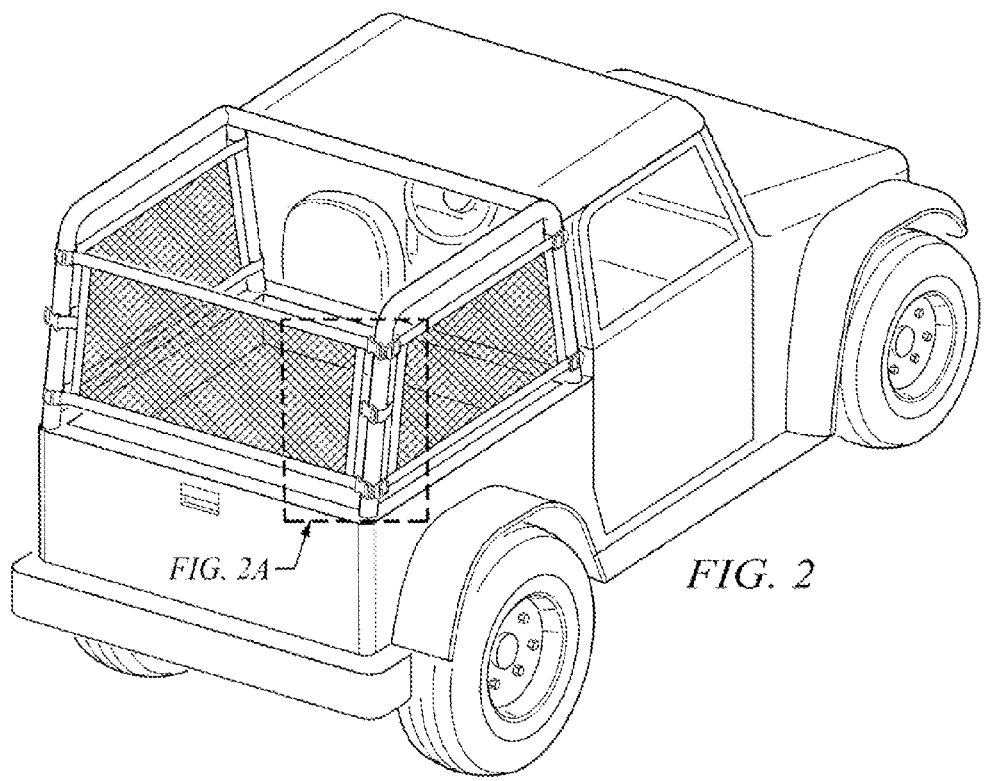
FIG. 2 shows the invention in its preferred embodiment as attached to a vehicle.
Figure 2A:
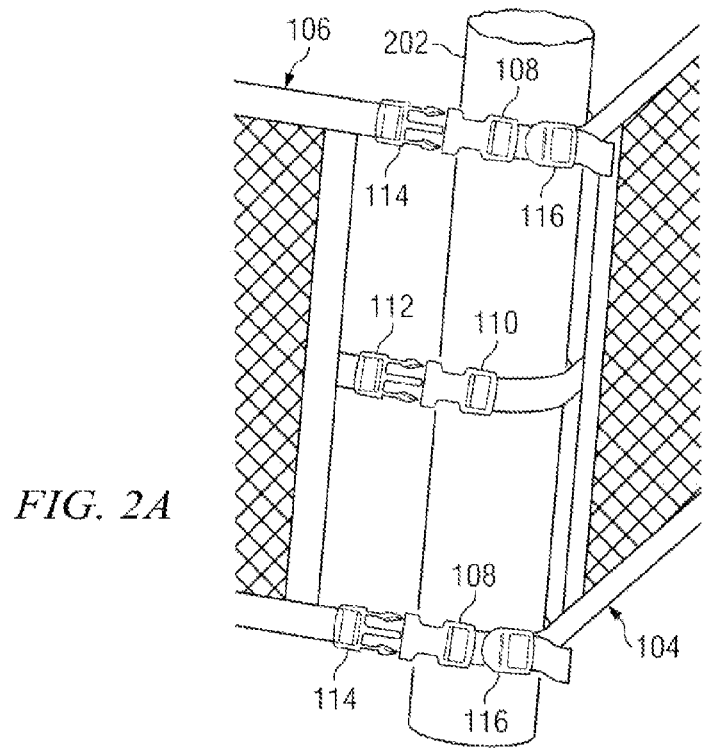
FIG. 2A illustrates a magnified image of the releasable buckle arrangement of the attached right and center netting unit assemblies.

FIG. 2 shows the invention in its preferred embodiment as attached to a vehicle. When attached as intended, the invention effectively encloses the area between the roll bar uprights in the driver's side, tailgate, and passenger side areas. A closer view of the attachment at the right rear corner of the vehicle is depicted in FIG. 2A, demonstrating how the rear unit connects to the side unit by way of quick release fasteners.

As depicted, the close-up view (FIG. 2A) illustrates the right netting unit (104) and center netting unit (106) attached to the roll bar upright (202). The right unit quick-release attachment (108) is joined with the corresponding center unit buckle (114) and the tension is adjusted using the corresponding tensioning device (116). Likewise, the centrally mounted attachment devices (110 and 112) are joined as well. Not shown in this figure, but described in greater detail below, is how the webbing strap for the right side unit (104) wraps around the roll bar upright (202) to allow the tensioning device (116) to function.

Figure 3:
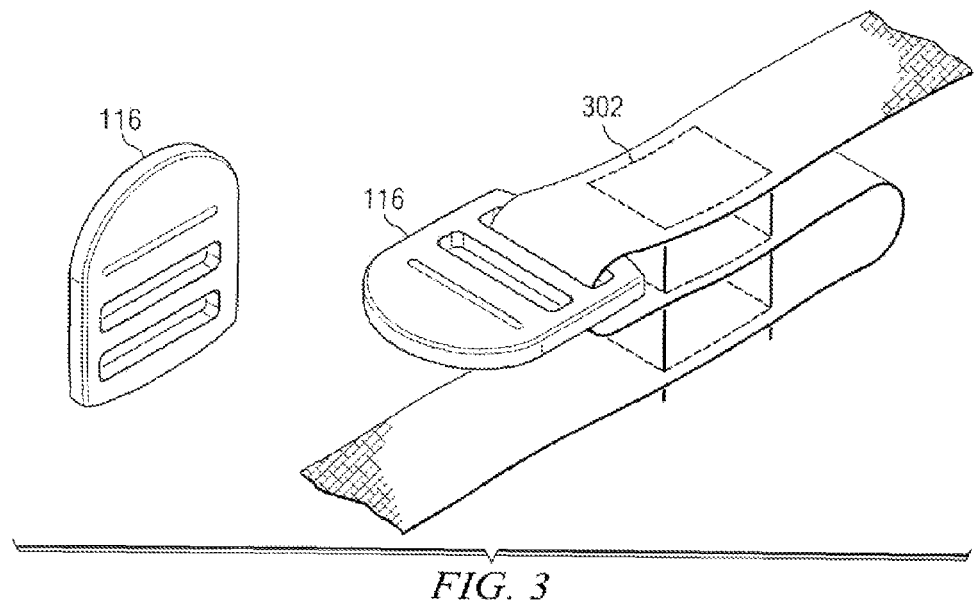
FIG. 3 illustrates one method of attaching the tensioning devices to the left and right netting unit assemblies.

FIG. 3 illustrates a method for attaching a tensioning device (116) to one of the side netting units. In this embodiment the fastener is attached by looping the extended border webbing through the tensioning device and doubling the material back against itself, forming three layers of material which are then stitched together (302) creating a length of material with the tensioning device permanently affixed at the position required for the specific vehicles design.

Figure 4:
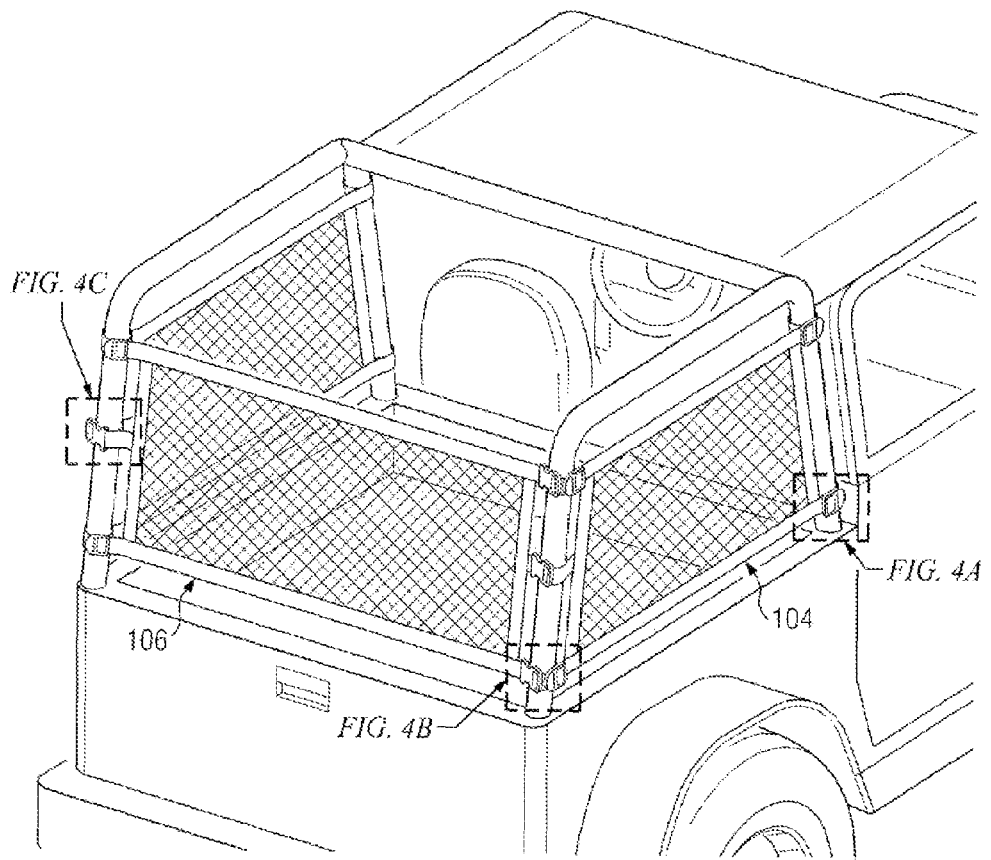
FIG. 4 shows a closer view of the invention as attached to the vehicle.
Figure 4A:
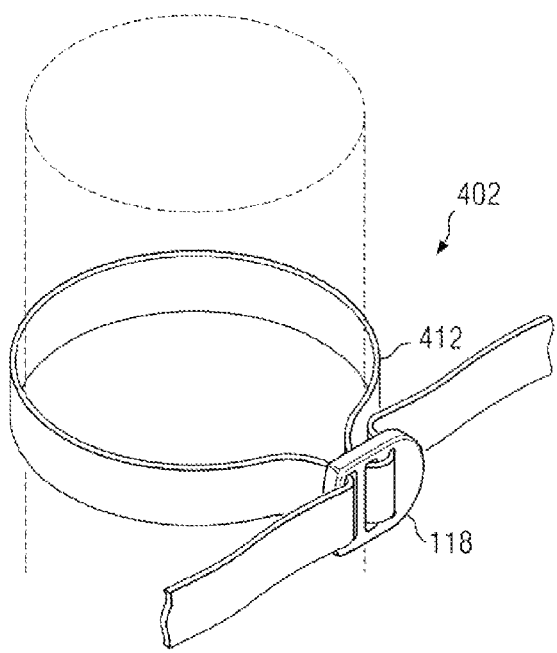
FIGS. 4A, 4B & 4C illustrate a focus on the connections to the roll bar, further depicting arrangement of the webbing strap and quick-release fasteners.
Figure 4B:
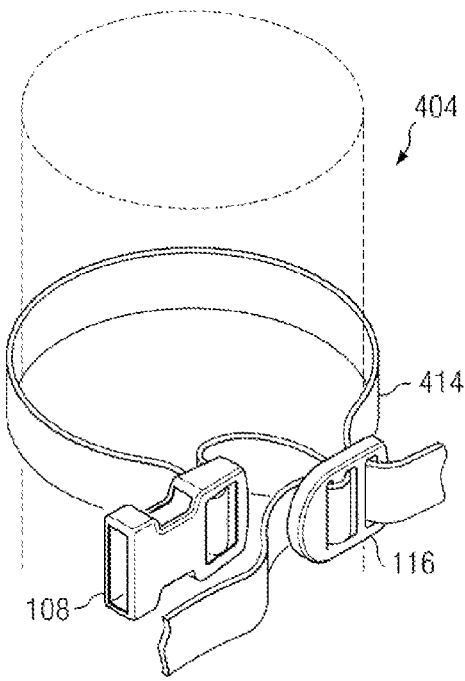
Figure 4C:
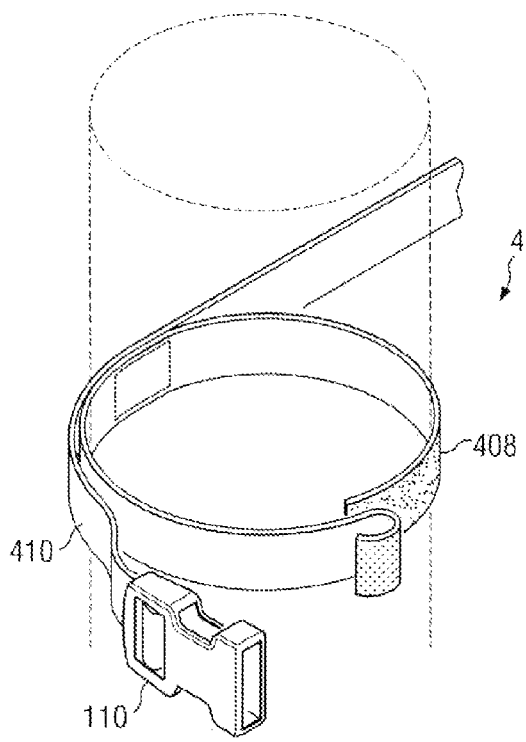

FIG. 4 illustrates the attachment of the invention to the vehicle at specific points. FIGS. 4A, 4B, and 4C depict magnified views of the various attachment points to demonstrate how the straps, releasable buckle, and tensioning devices are configured for attachment. The forward most straps of each side netting unit assembly attach to the vehicle by looping the extended strap portion (412) around the respective roll bar upright and then back through the tensioning device (118) as shown in FIG. 4A. This procedure is repeated on both the right and left netting units, for both the top and bottom straps as indicated (402). The rear webbing strap (414) of each side netting unit assembly is likewise looped around the rear roll bar upright in the manner depicted in FIG. 4B (404), permitting the additional fastener (108) to be available for connection to the center netting unit.

Referring to FIG. 4C, the centrally located attachment device (110) and associated strap (410) utilize hook and loop fastening material (408). This hook and loop material allows for attachment of the respective strap around the respective rearmost roll bar upright as depicted (406). In this embodiment, the hook and loop material is of the same width as the strap to which it is attached, and is of sufficient length to wrap around the roll bar upright and attach to itself as intended. The hook and loop material is affixed to the strap (410) at a point midway between the attachment device (110) and the netting.

Referring once more to FIG. 4, the device of the present embodiment is installed oil the vehicle in the following manner. First, the left and right side (104) netting units are installed, followed by the center netting unit (106). If beginning with the right side unit (104), the front straps are wrapped around the forward most roll bar upright as depicted (402). Next, the rear straps are wrapped around the rearward most roll bar upright as depicted (404). Tension on each strap is adjusted to hold the unit (104) in place. Finally, the centrally located strap with the hook and loop fastener (408) is attached to the rearward most roll bar upright by wrapping the hook and loop fastener material around the roll bar (406). The left side netting unit is mounted in the same fashion. One skilled in the art will appreciate that the side netting units may be installed in any order. Further, the attachment straps on a particular side netting unit may be installed in any order and still be covered by the inventive concept.

To complete the installation, the center netting unit (106) attachment devices are mated with the respective attachment devices of the left and right side netting units. This effectively closes the rear opening of the vehicle roll bar. As is evident from the installation, an advantage of the design is that the side netting units remain firmly in place while the center netting unit may be removed if necessary. This can be helpful if rear access to the vehicle's interior is required. Further, by utilizing independent attachment points to the roll bar the invention may be utilized independent of the convertible top. This allows the top to be manipulated at will without disturbing the installed cargo net device.

The present embodiment utilizes quick release attachment and tensioning devices that are manufactured from polymer materials. These devices are well suited to the nylon webbing utilized for the strap material that borders the netting units. However, one skilled in the art will appreciate that other materials may be utilized and are within the scope of the present invention. For example, the quick release buckles and/or tensioning devices may be manufactured from metal, fiber composites, or some combination of polymer, metal, and/or fiber composites. Likewise, the strap may be nylon, polyethylene, canvas, fiber, or some suitable combination thereof.

The foregoing detailed description of the present invention is provided for the purposes of illustration only, and is not intended to be exhaustive or to limit the invention to the precise embodiment disclosed. Accordingly, the scope of the present invention is defined solely by the following claims.

We claim:

1. A cargo containment apparatus for a convertible vehicle, the vehicle having at least a partially removable top and a roll bar, the roll bar having at least four upright bar members, wherein the bar members are disposed near the periphery of the cargo area of the vehicle such that the roll bar approximately defines the interior cargo space of the vehicle, the apparatus comprising:

a first panel for attachment to the driver's side roll bar uprights and second panel for attachment to the passenger's side roll bar uprights, each panel comprising:
 a flexible netting material;
 a first and second forward flexible strap extending beyond the forward edge of the netting material, wherein each forward strap includes a tensioning device through which the strap is woven such that a loop having sufficient diameter to encircle one of the forward roll bar uprights is formed; and a first and second rearward flexible strap extending beyond the rearward edge of the netting material, wherein each rearward strap includes a releasable buckle and a tensioning device through which the strap is woven such that a loop having sufficient diameter to encircle one of the rearward roll bar uprights is formed; and a third panel for releasable attachment to the rearward strap releasable buckles of the first and second panels, the third panel comprising:

a flexible netting material;

a first and second driver's side attachment device extending from the driver's side edge of the flexible netting material, each attachment device for releasably coupling with a corresponding releasable buckle on the first panel; and a first and second passenger's side attachment device extending from the passenger's side edge of the flexible netting material, each attachment device for releasably coupling with a corresponding releasable buckle on the second panel.

2. The apparatus of claim 1, the first and second panels further comprising:

a third rearward flexible strap extending beyond the rearward edge of the netting material between the first and second rearward straps, wherein the third rearward strap includes a releasable buckle and an attached hook and loop fastener material, wherein the hook and loop fastener material is of sufficient length to allow it to encircle one of the rearward roll bar uprights.

3. The apparatus of claim 2, the third panel further comprising:

a third driver's side attachment device for coupling with the first panel's third rearward flexible strap; and a third passenger's side attachment device for coupling with the second panel's third rearward flexible strap.

4. The apparatus of claim 1, wherein the first and second panel netting material is sized such that it substantially occupies the area defined between the respective forward and rearward roll bar uprights.

5. The apparatus of claim 1, wherein the third panel netting material is sized such that it substantially occupies the area defined between the rearward roll bar uprights.

6. The apparatus of claim 1, wherein the third panel may be removed for access to the cargo area without affecting the position of either the first or second panels.

* * * * *

UNITED STATES PATENT AND TRADEMARK OFFICE
CERTIFICATE OF CORRECTION

| | | |
|---|---|---|
| PATENT NO. | : 7,618,081 B2 | Page 1 of 1 |
| APPLICATION NO. | : 11/677558 | |
| DATED | : November 17, 2009 | |
| INVENTOR(S) | : Jesse Roy Rankin et al. | |

It is certified that error appears in the above-identified patent and that said Letters Patent is hereby corrected as shown below:

On the Title Page:
Item (57), Abstract:

Line 1, please change [An device] to -- A device -- to read "A device for attaching a cargo restraint system".

Line 4, please change [an] to -- a -- to read "by attaching a device around said roll bar".

In the Specification:

Column 2, line 18, please delete "a focus on the" to read "FIGS. 4A, 4B & 4C illustrate connections to the roll bar".

Column 4, line 5, please change [oil] to -- on -- to read "embodiment is installed on the vehicle".

Signed and Sealed this
Thirtieth Day of August, 2011

David J. Kappos
*Director of the United States Patent and Trademark Office*